US006898797B1

(12) United States Patent
Okamoto (10) Patent No.: US 6,898,797 B1
(45) Date of Patent: May 24, 2005

(54) OPTICAL DISC CARTRIDGE WHICH PROTECTS A DISC THEREIN FROM AMBIENT LIGHT

(75) Inventor: Akihiko Okamoto, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1826 days.

(21) Appl. No.: 08/498,385

(22) Filed: Jul. 5, 1995

(30) Foreign Application Priority Data

May 7, 1994 (JP) .............................................. 6-153399
Jul. 10, 1994 (JP) .............................................. 6-243607
Nov. 14, 1994 (JP) .............................................. 6-278701

(51) Int. Cl.[7] .............................................. G11B 23/03
(52) U.S. Cl. ...................................... 720/726; 369/291
(58) Field of Search ........................ 369/291; 360/133; 359/350, 359, 361, 589; 427/167

(56) References Cited

U.S. PATENT DOCUMENTS

| 4,455,642 A | * | 6/1984 | Inaba | 369/291 |
| 4,560,252 A | * | 12/1985 | Mori | 350/315 |
| 5,195,082 A | * | 3/1993 | Revay et al. | 369/284 |
| 5,315,099 A | * | 5/1994 | Gunz et al. | 359/63 |
| 5,319,630 A | * | 6/1994 | Earman et al. | 369/291 |

FOREIGN PATENT DOCUMENTS

JP    1-93674    6/1989

OTHER PUBLICATIONS

Kirk–Other Encyclopedia of Chemical Technology, Third Edition, vol. 10, 1980, pp. 247–283, Stuart M. Lee, "Film Deposition Techniques".
Microelectronic Processing, An Introduction to the Manufacture of Integrated Circuits, 1987, pp. 128–132, W. Scot Ruska.
Kirk–Othmer, Encyclopedia of Chemical Technology, Third Edition, vol. 23, 1983, pp. 615–627, Martin Dexter, "UV Stabilizers".
Kirk–Othmer Encyclopedia of Chemical Technology, Third Edition, vol. 16, 1981, pp. 522–554, Edward K. Letzer, "Optical Filters".

* cited by examiner

Primary Examiner—George J. Letscher
(74) Attorney, Agent, or Firm—Oblon, Spivak, McClelland, Maier & Neustadt, P.C.

(57) ABSTRACT

An optical disc cartridge for storing an optical disc. The cover of the optical disc cartridge absorbs or filters ambient light which may damage information stored on the disc after prolonged exposure to the ambient light. Preferably, the disc cartridge cover allows some visible light to pass in order to allow a user to read label information on the disc. The color of the cover may be transparent to visible light, allow only specific visible wavelengths of light to pass, or be opaque, as long as the amount of ambient light reaching the disc stored within the disc cartridge is reduced. The disc cover may be made of a single layer or include a base layer with one or more thin films thereon.

25 Claims, 6 Drawing Sheets

OPTICAL DISC CARTRIDGE WHICH PROTECTS A DISC THEREIN FROM AMBIENT LIGHT

BACKGROUND OF THE INVENTION

1. Field of the Invention

The present invention relates to an optical disc cartridge or caddy and more particularly relates to an optical disc cartridge or caddy which protects the disc stored therein from ambient light.

2. Discussion of the Background

Figure 7:
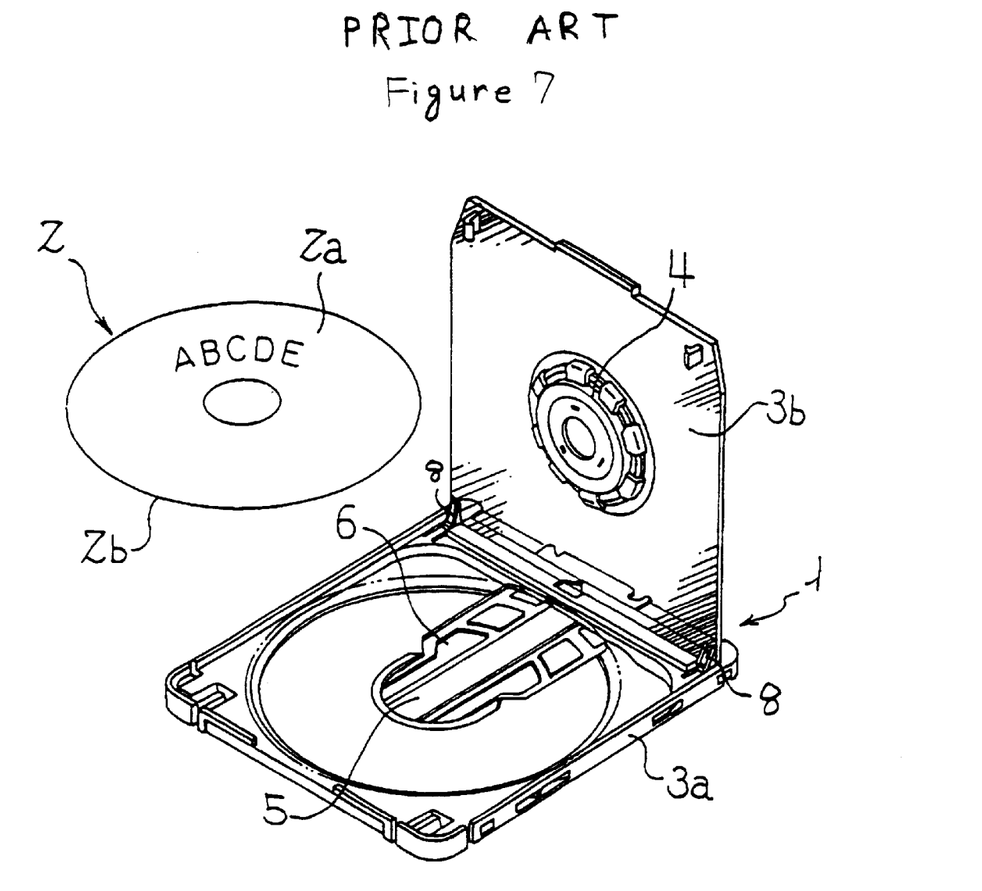
FIG. 7 illustrates a conventional optical disc cartridge holder or caddy.
Figure 8:
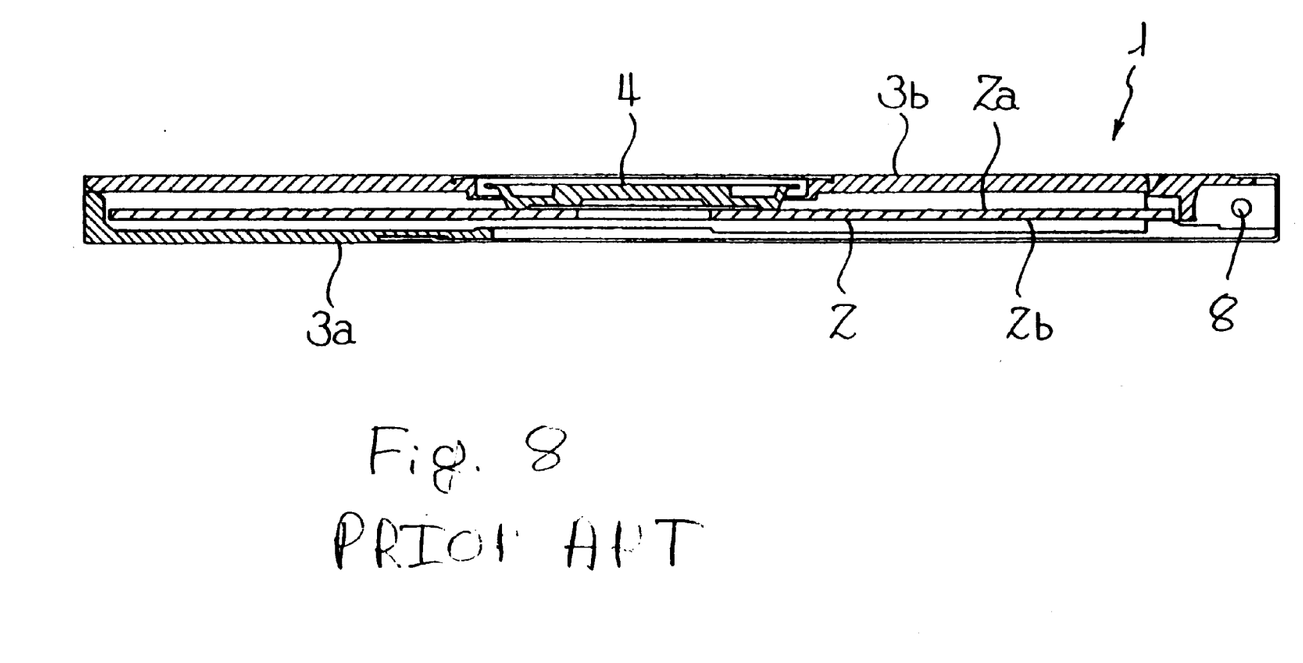
FIG. 8 illustrates a cross-sectional view of the optical disc cartridge illustrated in FIG. 7.

A conventional optical disc cartridge or caddy 1 is shown in FIGS. 7 and 8 and corresponds to the optical disc cartridge of Japanese Utility Model No. 1-93674 (1989) which is incorporated herein by reference. This disc cartridge has become a defacto standard for CD-ROMs and was developed by Sony. The optical disc cartridge 1 includes a box-shaped body 3a for holding an optical disc 2. The disc cartridge includes a cover 3b which opens in order to insert and remove the optical disc 2. The cover 3a pivots on hinges 8. In the center of the inner side of the cover 3b, there is a rotatable clamper 4 which clamps the optical disc 2 to a disc driving device (not shown) in an optical disc recording/reproducing apparatus. The cartridge body 3a includes an opening 5 used by an optical head to access the disc 2 through a slidably mounted shutter 6 which opens and closes the opening 5.

The optical disc 2 may be a CD-ROM which is a read only memory used exclusively for playing pre-recorded information or a CD-R which is a recordable compact disc used to store information specified by a user and which is retrievable by a user. For a conventional CD-ROM, one side of the disc 2 will be a label 2a containing printed information such as the letters "ABCDE" illustrated in FIG. 7. The bottom side of the disc 2 is used to store information readable by a CD reader or player. The outer edge of the disc is designated by 2b. The cover 3b of the optical disc cartridge or caddy is a transparent material which allows a user to see the information 2a on the disc, even when the disc is in the cartridge 1 and the cover 3b of the cartridge is closed.

Information is stored on CD-ROMs as convex indentations known as pits, or concave protrusions. Generally speaking, these concave and convex portions of the disc do not deteriorate due to exposure to light. However, for recordable compact discs (CD-Rs), as the disc has information recorded thereon by a laser in a recording/reproducing apparatus, for example a laser beam with a wavelength of 780 nanometers and a power of 5 to 10 milliwatts, information on the disc can be deteriorated or destroyed by exposure to light. In order to read the disc, a laser having a wavelength of 780 nanometers using a power of 0.5 milliwatts is typically used.

The present inventor has realized that if a CD-R is placed in a cartridge having a transparent cover and exposed to light, information on the disc may be deteriorated or destroyed.

SUMMARY OF THE INVENTION

Accordingly, an object of the present invention is to provide an optical disc cartridge which prevents information on a disc therein from deteriorating due to exposure to ambient light and allow label information to be read through the cover of the cartridge.

A further object of the invention is to provide an optical disc cartridge which protects the information on the disc from being destroyed by light at a low cost.

It is yet another object of the present invention to provide an optical disc cartridge which prevents the information stored on the disc from being destroyed by ambient light while still allowing label information on the disc to be read through the cover of the cartridge.

These and other objects are achieved by the present invention which is an optical disc cartridge or other disc holder which absorbs or filters ambient light such as ultraviolet light and/or infrared light and prevents data recorded on the disc from being destroyed due to exposure to the ambient light. The cover of the disc cartridge is made of a material transparent to visible light which absorbs ultraviolet light. As an alternative, the optical disc cartridge cover filters a portion of the visible light spectrum in addition to the ultraviolet light. As yet another alternative, the optical disc cartridge may be made of a black or brown material which absorbs or filters in a somewhat uniform manner, a percentage of the visible light in addition to filtering the harmful ultraviolet light.

The optical disc cartridge cover may be made of a single layer of material or may include a substrate with a light absorbing film thereon.

BRIEF DESCRIPTION OF THE DRAWINGS

In describing preferred embodiments of the present invention illustrated in the drawings, specific terminology is employed for the sake of clarity. However the invention is not intended to be limited to the specific terminology so selected and it is to be understood that each specific element includes all technical equivalents which operate in a similar manner.

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
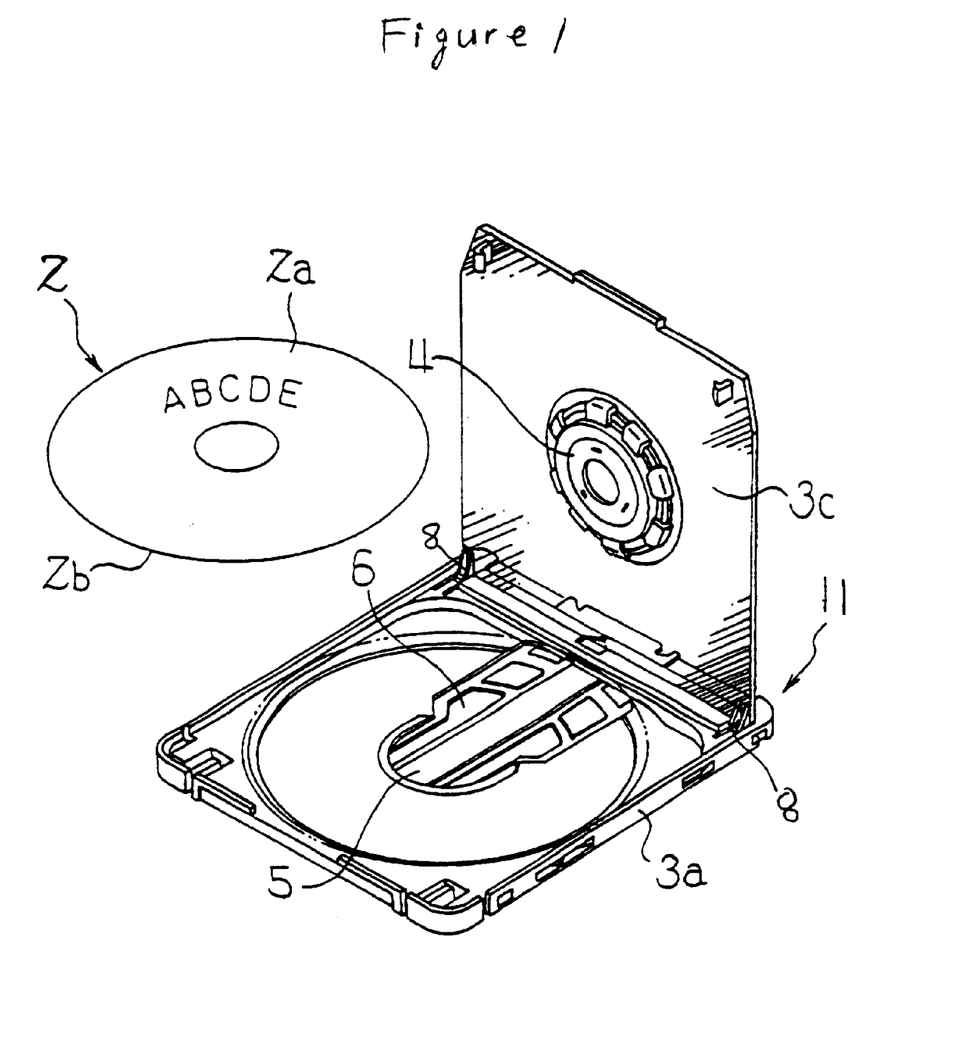
FIG. 1 is a perspective view showing an optical disc cartridge according to the present invention.

Referring now to the drawings, wherein like reference numerals designate identical or corresponding parts throughout the several views, and more particularly to FIG. 1 thereof, there is illustrated an optical disc cartridge or caddy 11 having the same basic structure as the optical disc cartridge illustrated in FIGS. 7 and 8 and described in the "Discussion of the Background" section. The cartridge 11 can be used for optical discs which are CD-ROMs, CD-Rs, erasable optical discs, or any type of optical disc, and may be openable as illustrated in FIG. 1, or may be permanently sealed.

The cover 3c of the optical disc cartridge 11, in contrast to the cover 3b illustrated in FIGS. 7 and 8, is made of a material which absorbs or filters harmful ambient light including ultraviolet light and/or infrared light from reaching the optical disc 2. Preferably, the cover 3c allows some visible light to pass through the cover 3c while preventing a majority of the harmful ultraviolet light from reaching, and consequently altering and destroying the information recorded on the optical disc 2. It is important for the cover to shield the disc 2 from ultraviolet light such as that contained in light rays from the sun as direct sunlight is extremely damaging to a CD-R in comparison to the amount of alteration to the data stored on the disc caused by visible light which is typically experienced in the office environment. It is also possible to make the body 3a of the same material to absorb or filter the harmful ambient light. This may be done either in addition to making the cover of this material or in place thereof. Further, with the increase in use of portable computers which contain drives for reading optical discs, and the subsequent increase in the transport of optical-discs out of the office environment, it becomes more important to have compact disc cases which shield the harmful ultraviolet light rays from the sun.

In general, the cartridge body 3a is made of an opaque material colored white, gray, black, or other color. However, the teachings of the present invention may also be applied to an optical disc cartridge, caddy, or storage device which allows visible light to pass through both sides so that label information written on both sides of a disc within the cartridge, caddy, or other storage device can be read by a user.

Figure 2A:
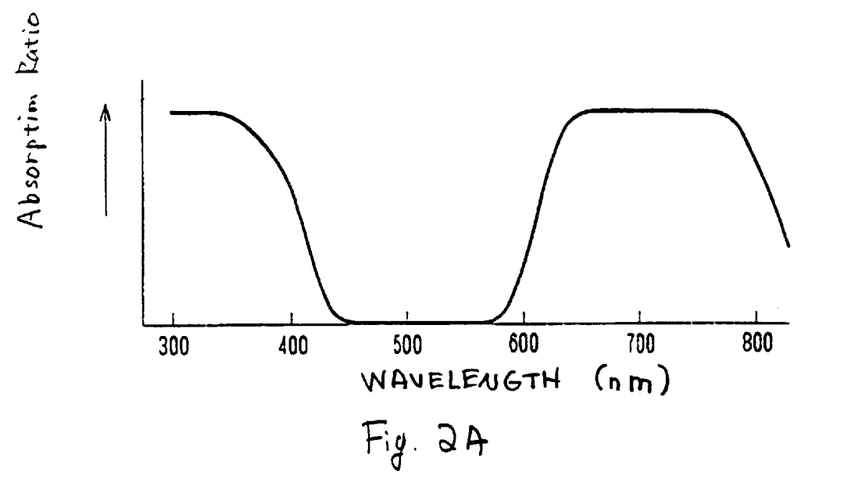
FIG. 2A illustrates a relationship between the light absorption ratio and wavelength of the recording material of a recordable optical disc.

FIG. 2A illustrates the light absorption ratio of the recording material of a typical CD-R versus the wavelength of light. In FIG. 2A, it is seen that more light is absorbed at the 300–400 nanometer and 600–800 nanometer region than the 400–600 nanometer (visible light) region. Therefore, it is desirable to filter out the light at the 300–400 nanometer (ultraviolet) range and 600–800 nanometer range (infrared). It is further desirable to allow at least some light in the 400–600 nanometer range to pass through the optical disc cartridge cover 3c in order to be able to read the disc label.

Figure 2B:
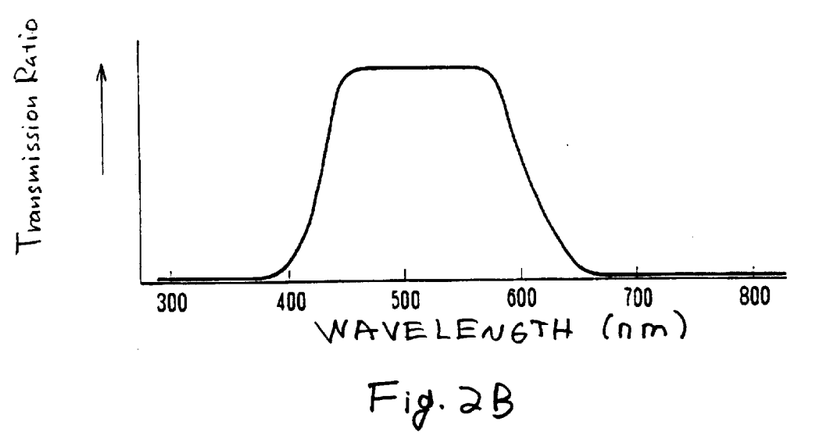
FIG. 2B illustrates the relationship between a desired transmission ratio and a wavelength of light for the cover of the optical disc cartridge.

Based on the absorption ratio illustrated in FIG. 2A, the ideal transmission ratio of the optical disc cartridge cover 3c is illustrated in FIG. 2B. This figure illustrates that visible light which is in the range of 400–600 nanometers should be allowed to pass through the cover while the cover prevents infrared and ultraviolet light from being transmitted therethrough. While it is desirable to prevent both infrared and ultraviolet light from being transmitted through the cover 3c, it is the ultraviolet light which has a higher energy than the infrared light and is therefore more destructive. Accordingly, of importance to the invention is the absorption or filtering of ultraviolet light and prevention of this light from reaching the interior of the optical disc cartridge.

Figures 3, 4A:
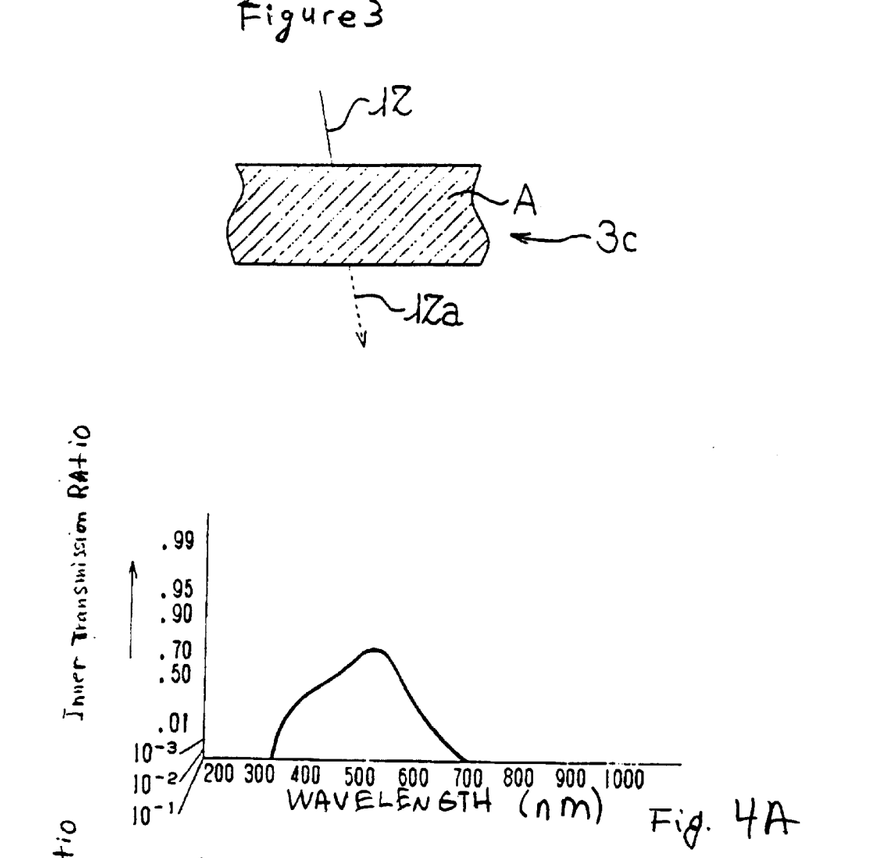
FIG. 3 illustrates a sectional view of the optical disc cartridge cover.
FIG. 4A illustrates the relationship between the inner transmission ratio of a first type of green colored filter over a range of light wavelengths.

FIG. 3 illustrates a cross-sectional view of the cover 3c. In FIG. 3, the cover 3c is made of a substrate A. Light 12 enters the cover 3c and only light 12a having a specific range of wavelengths passes through the cover 3c. The amount of light 12a and the wavelengths of the light 12a depends on the material making up the 3c.

The material used to construct the cover 3c may be polycarbonate (PC); polyvinyl chloride (PVC); homopolymers or copolymers of styrene, substituted styrene, acrylonitrile such as polystyrene, poly(styrene-acrylonitrile) (SAN), poly(acrylonitrile-butadiene-styrene)(ABS), poly (α-methylstyrene), poly(o-,m- or p-methylstyrene); acrylic and methacrylic ester homopolymers and copolymers such as methyl methacrylate, ethylmethacrylate, butylmethacrylate methylacrylate, ethylacrylate, butylacrylate, isobutylacrylate ethylexylacrylate and copolymers with acrylic acid or methacrylic acid; copolymers of acrylate esters and methacrylate esters with styrene, substituted styrene or acrylonitrile; homopolymers or copolymers of α-olefines such as ethylene, propylene and isoprene; polyurea, polyurethane, polyethylene terephthalate (PET); polybutylene terephthalate (PBT); phenolics; or polyamide. The above polymeric materials may be used as blended compositions. Furthermore, the polymeric materials may be toughened by blending with toughening agents which are well known in the art. To these base materials, the appropriate light absorbing material is added in order to achieve the desired light transmission and absorbing properties which are described below.

FIG. 4A illustrates the inner transmission ratio of a green colored filter which can be used as the cover 3c. The inner transmission ratio is the transmission (also called outer transmission) ratio minus the reflection loss. The inner transmission ratio illustrated in FIG. 4A is the inner transmission ratio of a Melles Griot Company, headquartered in the United Kingdom, Type BG18 green colored filter which absorbs the color red. This filter allows green light around 500 nanometers to be transmitted and absorbs a large amount of light outside of the visible range including infrared and ultraviolet light.

Figure 4B:
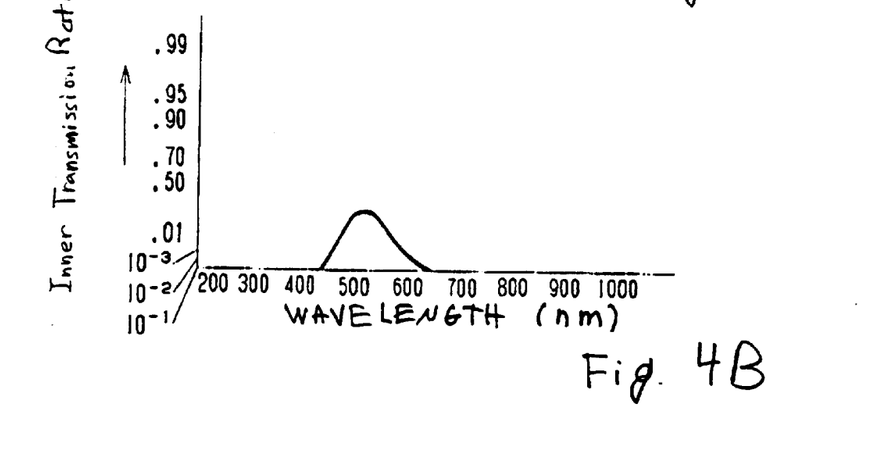
FIG. 4B illustrates the relationship between the inner transmission ratio of a second type of green colored filter over a range of light wavelengths.

As an alternative to the green filter Type BG18 having an inner transmission index as illustrated in FIG. 4A, a green colored filter having transmission characteristics equivalent to or similar to a Type VG14 filter by the Melles Griot Company as illustrated in FIG. 4B may be used. The range of wavelengths transmitted and the amount of light transmitted by a filter having characteristics as illustrated in FIG. 4B is reduced compared to FIG. 4A. Therefore, the disc within a case having a cover with the properties as illustrated in FIG. 4B will be more resistant to deterioration by light than a cover having the inner transmission index characteristic as illustrated in FIG. 4A.

When the cover 3c has a colored filter effect as described above with respect to FIGS. 4A and 4B, the cost is not substantially increased as compared to a conventional cover 3b which is formed using only a transparent material.

The color and filter type is not limited to green or the specific filters discussed above with respect to FIGS. 4A and 4B but other color filters may be used. Specifically, red or orange covers may be used which have characteristics similar to red or orange glass filters sold by the Melles Griot Company of any combination of colored filters may be used.

Further information regarding filters having properties which may be used in the cover 3c of the optical disc cartridge are described in the "Encyclopedia of Chemical Technology", Kirk-Othmer, 3rd edition, 1981, vol. 16, in the section on optical filters, pp. 522–554, and the references listed therein, which, along with each of the references, is incorporated herein by reference.

As an alternative to using a colored filter such as green, red, orange, or other colored filter, it is possible to use a cover 3c which is transparent or substantially transparent to visible light but absorbs ultraviolet and/or infrared light. Substantially transparent includes transparent filters and is defined to mean that the cover appears untinted or having only slight tinting. Materials which absorb ultraviolet rays include phenyl salicylate compounds, benzophenone compounds, benzotriazole compounds, or cyanoacrylate compounds. Additionally, an antioxidant may be added such as an amine or phenol compound. Additional information about ultraviolet absorbing material and antioxidants which may be used by the invention are found in the "Encyclopedia of Chemical Technology", Kirk-Othmer, 3rd edition, vol. 23, 1983, in the section on UV stabilizers, pp. 615–627, the disclosure of which and each of the cited publications in the bibliography are incorporated herein by reference.

Figure 5:
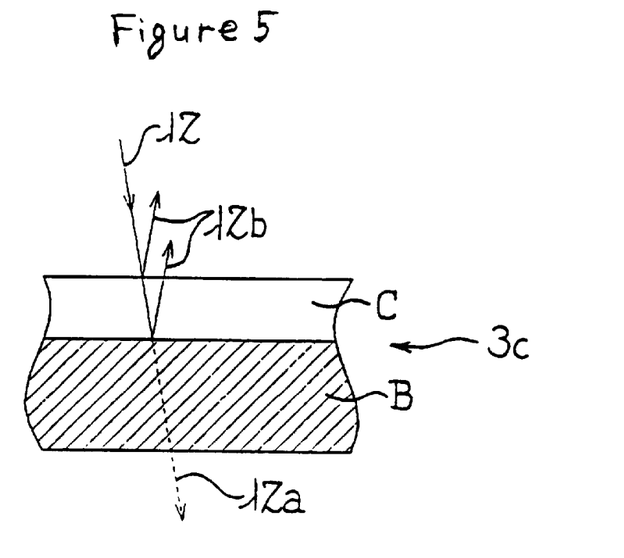
FIG. 5 is a schematic sectional view showing a cover having a film coating.

As an alternative to constructing the cover 3c as a single substrate or layer as illustrated in FIG. 3, the cover 3c may be made of a transparent substrate B made of a polycarbonate resin, acrylic resin, or other material described above, and have a single or multilayer thin film C thereon as illustrated in FIG. 5. Light 12 directed towards the surface C has a portion thereof reflected upon encountering the thin film C and another portion thereof reflected at the boundary between C and B. This reflected light is designated as 12b. The transmitted light 12a contains only desired wavelengths of light which will not damage or destroy, or reduce the amount of destruction caused to the optical disc within the cartridge. If the light 12a contains all visible components, the recognition of the label on the disc by a user will be better than if a color for a specific wavelength of visible light such as a green colored filter is used. The material making up the thin film C in FIG. 5 is a dielectric which is applied via known spattering, sputtering, evaporating, or spin coating techniques. Details of these and other thin film coating techniques used by the invention are described in "Encyclopedia of Chemical Technology", Kirk-Othmer, 3rd edition, 1980, vol. 10, in the section on film deposition techniques, pp. 247–283, which along with the publications cited therein is incorporated herein by reference, and "Microelectronic Processing, an Introduction to the Manufacture of Integrated Circuits", by W. Scot Ruska, 1987, pp. 128–132, which discloses a spin coating technique, which is incorporated herein by reference.

The above thin film technique illustrated with respect to the cover of FIG. 5 may use either a transparent or colored substrate B, a transparent or colored thin film C and have the substrate B and/or thin film C including ultraviolet absorption properties.

Figure 6:
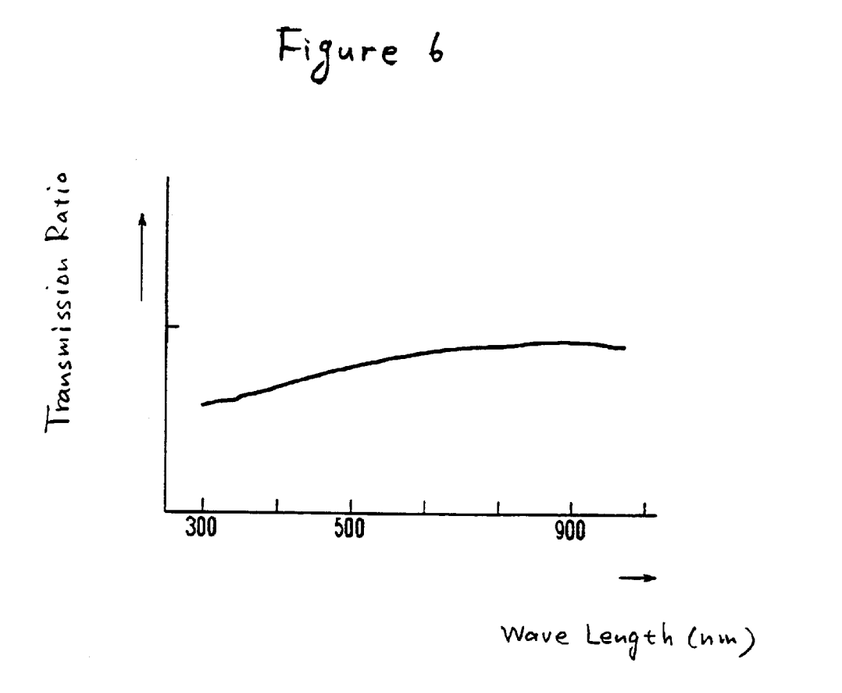
FIG. 6 shows the transmission ratio of a darkly shaded cover having a color such as black.

As an alternative to using a transparent or visible colored cover 3c as described above, the cover may be made of a semitransparent black material which tints the cover 3c to have a charcoal-like appearance. This uniformly reduces the transmission ratio of the cover 3c. Such a transmission ratio is illustrated in FIG. 6. As an alternative to using a black tinting, other dark tinting or shading such as a brown shading may be used. As the transparency ratio over the entire range of wavelengths is reduced, the optical disc 2 within the cartridge is protected.

In addition to shading using black or brown shading or tinting, an ultraviolet ray absorption material and/or antioxidant material may be included in the cover 3c in a similar manner as described above. A black or charcoal-shading of the cover 3c is often an attractive and desirable appearance to a consumer which may make the product commercially desirable by consumers.

As an alternative to the above-described embodiments, the cover 3c may be made of any other shaded or tinted material which absorbs ultraviolet light. This material may be carbon black, or an inorganic pigment such as iron oxide, phthalocyanine-green, cadmium red, or cadmium yellow. These materials will effectively shade ultraviolet rays. Depending on the amount of these materials used which affects the transparency of the cover 3c, the cover 3c may be opaque and have a black, green, red, yellow, or other color, or may be semitransparent and act as a light filter and only allow certain colors to pass therethrough. In addition to including these materials, a material transparent to the range of visible light having a purpose of ultraviolet ray shading such as described above may be used in combination with the above-described pigments.

Obviously, numerous modifications and variations of the present invention are possible in light of the above teachings. It is therefore to be understood that within the scope of the appended claims, the invention may be practiced otherwise than as specifically described herein.

For example, the invention is not limited to a disc cartridge or disc caddy but may be used for a disc jewel case or a permanently sealed case. The invention may also be used for the top and bottom portions of a disc cartridge which may be especially suitable for double sided discs. Further, the above described features may be used in appropriate combinations which produce desirable results.

What is claimed as new and desired to be secured by Letters Patent of the United States is:

1. An optical disc holder, comprising:
   a body;
   a cover;
   at least one of said body and said cover filtering specific wavelengths of ambient light, thereby preventing the specific wavelengths of ambient light from passing therethrough and reaching an interior of said optical disc holder while allowing light having visible wavelengths to pass therethrough.

2. The optical disc holder of claim 1, wherein:
   said at least one of said body and said cover allows light having the visible wavelengths to pass therethrough to enable a label on an optical disc therein to be viewed by a person.

3. The optical disc holder of claim 2, wherein:
   said at least one of said body and said cover is an ultraviolet light filter.

4. The optical disc holder of claim 2, wherein:
   said at least one of said body and said cover is an infrared light filter.

5. The optical disc holder of claim 2, wherein:
   said at least one of said body and said cover is both an infrared light filter and an ultraviolet light filter.

6. The optical disc holder according to claim 2, wherein:
   said at least one of said body and said cover transmits therethrough more light of predetermined visible wavelengths than visible wavelengths different from the predetermined visible wavelengths.

7. The optical disc holder according to claim 6, wherein said at least one of said body and said cover transmits one of green light, red light, orange light, and combinations thereof.

8. The optical disc holder according to claim 2, wherein said at least one of said body and said cover is shaded one of black and brown.

9. The optical disc holder according to claim 8, wherein said at least one of said body and said cover includes an ultraviolet ray shading material.

10. The optical disc holder according to claim 9 wherein the ultraviolet ray shading material is selected from the group consisting of phenyl salicylate compounds, benzophenone compounds, benzotriazole compounds, and cyanoacrylate compounds.

11. The optical disc holder according to claim 1, further comprising:

a hinge mechanism connecting the cover to the body.

12. The optical disc holder according to claim 11, wherein the optical disc holder is an optical disc cartridge.

13. The optical disc holder according to claim 11, wherein the optical disc holder is a disc jewel case.

14. The optical disc holder according to claim 3, wherein said at least one of said body and said cover is substantially transparent to all wavelengths of visible light.

15. An optical disc holder, comprising:

a body;

a cover; and hinges connecting the body to the cover which allows the optical disc holder to be opened in order to insert and remove an optical disc, wherein at least one of said body and said cover includes filter means which absorbs ultraviolet light while allowing visible light to pass therethrough in order for a person to view a label on a disc within the optical disc holder.

16. An optical disc holder according to claim 15, wherein:

the filter means allows only portions of a visible light spectrum to pass therethrough.

17. An optical disc holder according to claim 15, wherein:

the filter means further absorbs infrared light.

18. An optical disc cartridge for holding an optical disc, comprising:

a cartridge body for holding the optical disc;

a cover, attached to the cartridge body, which opens and closes the disc cartridge;

at least one of said cartridge body and said cover preventing predetermined wavelengths of light from passing therethrough and reaching the optical disc, and allowing light having visible wavelengths to pass therethrough and reach the disc so that a label of the disc is viewable from an exterior of the optical disc cartridge;

a clamper, connected to the cover, which clamps the optical disc to a disc driving device;

an opening in the cartridge body through which an optical head accesses the optical disc; and a shutter, connected to the cartridge body, which opens and shuts the opening.

19. An optical disc according to claim 18, wherein said at least one of said body and said cover is a colored filter which prevents ultraviolet wavelengths of light from reaching the optical disc.

20. An optical disc according to claim 18, wherein said at least one of said body and said cover is substantially transparent to visible light and prevents ultraviolet wavelengths of light from reaching the optical disc.

21. An optical disc holder, comprising:

a body; and a cover, wherein at least one of said body and said cover is a filter of specific wavelengths of ambient light which prevents the specific wavelengths of ambient light from reaching an interior of said optical disc holder and allows light having visible wavelengths to pass therethrough.

22. An optical disc holder according to claim 21, wherein:

said filter is transparent to all wavelengths of visible light.

23. An optical disc holder according to claim 1, wherein:

said cover is transparent to all wavelengths of visible light.

24. An optical disc holder according to claim 15, wherein:

said filter means is transparent to all wavelengths of visible light.

25. An optical disc holder according to claim 18, wherein:

said cover is transparent to all wavelengths of visible light.

* * * * *

UNITED STATES PATENT AND TRADEMARK OFFICE
CERTIFICATE OF CORRECTION

PATENT NO. : 6,898,797 B1 Page 1 of 1
DATED : May 24, 2005
INVENTOR(S) : Okamoto It is certified that error appears in the above-identified patent and that said Letters Patent is hereby corrected as shown below:

Title page,
Item [30], Foreign Application Priority Data, should read:
-- [30]      Foreign Application Priority Data
      Jul. 5, 1994   (JP) ................................. 6-153399
      Oct. 7, 1994   (JP) ................................. 6-243607
      Nov. 14, 1994 (JP) ................................. 6-278701 --.

Signed and Sealed this

Twenty-third Day of August, 2005

JON W. DUDAS
*Director of the United States Patent and Trademark Office*